Nov. 6, 1956   W. G. ANNABLE ET AL   2,769,760
PRODUCTION OF SWEET NAPHTHAS FROM HYDROCARBON MIXTURES BY
HYDROFINING THE HYDROCARBON MIXTURE FOLLOWED BY CONTACTING
THE HYDROCARBON PRODUCT WITH A COMPOSITION
CONTAINING COBALT AND MOLYBDENUM
Filed Sept. 11, 1953
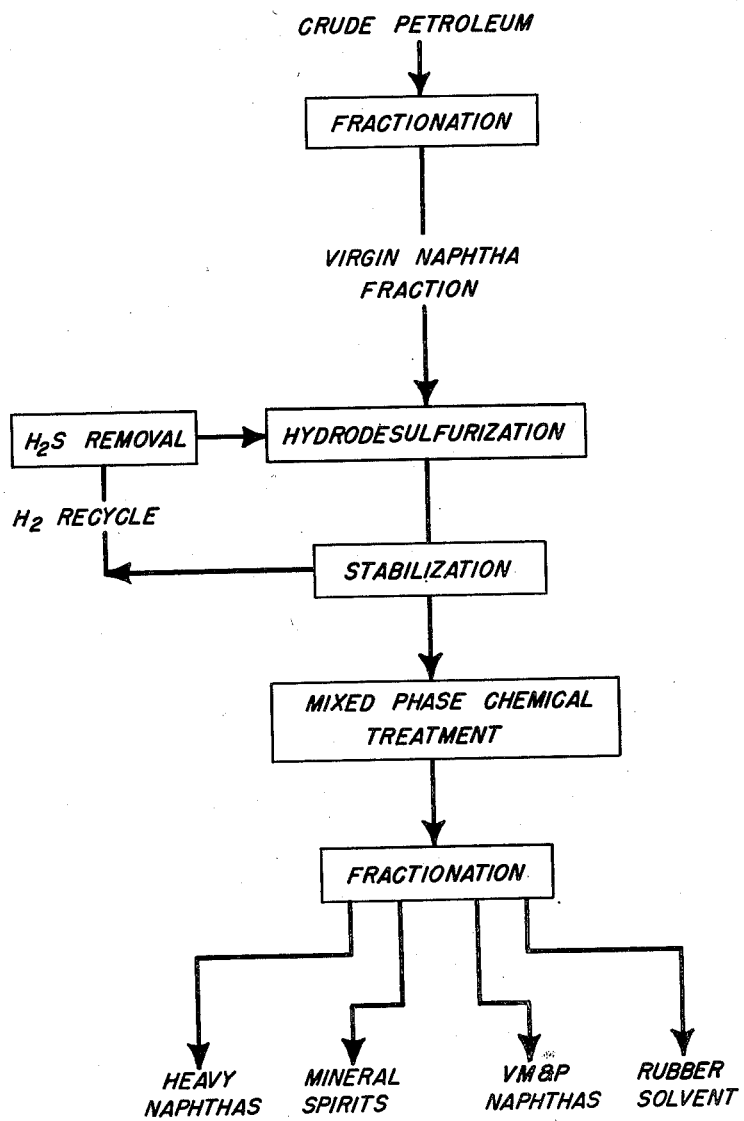
INVENTOR.
W. GRANT ANNABLE
LEROI E. HUTCHINGS
BY KENNETH LUCAS
ATTORNEY

United States Patent Office 2,769,760
Patented Nov. 6, 1956

2,769,760

PRODUCTION OF SWEET NAPHTHAS FROM HYDROCARBON MIXTURES BY HYDROFINING THE HYDROCARBON MIXTURE FOLLOWED BY CONTACTING THE HYDROCARBON PRODUCT WITH A COMPOSITION CONTAINING COBALT AND MOLYBDENUM

Weldon Grant Annable, Mundelein, Le Roi E. Hutchings, Lakewood, and Kenneth Lucas, Woodstock, Ill., assignors to The Pure Oil Company, Chicago, Ill., a corporation of Ohio Application September 11, 1953, Serial No. 379,528

4 Claims. (Cl. 196—28)

The present invention relates to a combination two-stage process of catalytic hydrodesulfurization and chemical treatment of high sulfur hydrocarbon mixtures and, more particularly, to a method of treating high or low sulfur stocks or highly aromatic stocks to produce improved naphthas characterized by their ability to pass the Distillation-Corrosion test. More particularly, the invention relates to an integrated process for producing high grade naphthas from hydrocarbon mixtures involving a catalytic hydrodesulfurization and a mixed phase chemical treatment with the same type of contact material as used in the hydrodesulfurization step.

Crude petroleum is the source of a large number of products ranging from simple distillation products and synthetic resins, elastomers, and polymers produced through physical and chemical transformations. Widely known petroleum derived products include gasoline, kerosene, diesel fuels, lubricating oils, and heavy tars. In many instances, the products obtained from petroleum are employed as reactants in the synthesis of additional petroleum derivatives and chemicals and a large number of products of petroleum are used directly without extended treatment or modification. Petroleum naphthas comprise a wide variety of such latter products used extensively in the dyeing, rubber, extraction, protective coating, and allied industries. A large portion of the petroleum naphthas used is the straight run naphthas which are selected fractions of the lower boiling, more volatile constituents of crude petroleum. The present invention is particularly directed to a method of preparing such straight run naphthas and to naphtha compositions of this variety and, accordingly, the term naphthas as used herein shall mean straight run petroleum naphthas. Also, where the term chemical treatment is used, it is meant to include both catalytic and non-catalytic conversion conditions in vapor, liquid, or mixed phase.

If the preparation of naphthas from petroleum is confined to physical means, the products inevitably contain other types of organic and inorganic compounds due to the complex nature of petroleum which have been found to be deleterious as far as certain end uses of the naphthas are concerned and necessitate the application of additional refining steps. Even with such additional refining, it is exceedingly difficult to prepare naphthas which meet the exacting specifications that have been established by the industry. Of these deleterious non-hydrocarbon compounds the sulfur and sulfur-containing constituents are generally the most bellicose and cling tenaciously to any environment in which they exist, imparting objectionable odor, corrosiveness, color, and other physical and chemical properties thereto. The odor of naphthas is important; however, no standard test exists to cover this property and the odor of a well refined naphtha is generally described as sweet.

Tests have been devised to determine both quantitatively and qualitatively the presence of these odious compounds in an attempt to control the properties and quality of naphthas from petroleum sources. For this purpose, various copper strip corrosion tests and the "Doctor" test have been used. Procedures established by A. S. T. M. may be used to determine the content and distribution of these sulfur compounds. Perhaps the most critical and rigorous qualitative test for determining the presence of corrosive sulfur compounds in naphthas in the Distillation-Corrosion test, known also as the Philadelphia test, the Amsco corrosion test, or the full boiling range corrosion test—by any name, a species of copper strip corrosion test. The test, widely applied by the manufacturers, distributors, and users of specialty naphthas, is carried out by the addition of a small pure copper coupon to an ordinary A. S. T. M. distillation flask containing 100 cc. of the naphtha to be tested. The copper strip is so positioned in the flask that one end of the strip contacts the residue at the end of the distillation, and the distillation is conducted according to A. S. T. M. D86–38 as described in A. S. T. M. Standards on Petroleum Products and Lubricants, published by the American Society for Testing Materials, Philadelphia, Pennsylvania. At the completion of the test, wherein the flask has been heated to dryness, the color of the copper strip is an indication of the relative amount of corrosive sulfur compounds present in the naphtha sample. A negative test is shown by the presence of a very slight or no tarnish on the strip and stamps the naphtha as satisfactory. If the copper strip becomes moderately tarnished or blackened, the results are interpreted as positive or unsatisfactory. The production of a slightly tarnished or slightly colored or corroded strip, indicated by a dark orange with peacock colorations thereon, is termed borderline and as such denotes a naphtha which is not acceptable and must be further refined. The market is limited for off-specification naphthas and further refining is expensive since even then there is no assurance that the product will pass the severe Distillation-Corrosion test.

The subjection of high sulfur content naphthas to various refining and sweetening operations which may include oxidation and extraction methods, or the recycling of rejected off-specification naphthas back through such a process, does not produce acceptable naphthas because the sulfur compounds remaining are corrosive in nature. High sulfur content naphthas usually have a poor odor as well as other undesirable properties. If straight run naphthas from high sulfur crudes are subjected to other more severe refining methods, the resulting products do not pass the Distillation-Corrosion test. Even subjecting these naphthas to the usual desulfurization treatments involving vapor or liquid phase contact with clay or catalytic materials having strong affinity for effecting desulfurization does not produce a satisfactory product. For example, it is known to be advantageous to successively treat hydrocarbons containing sulfur compounds to hydrodesulfurization processes followed by second stage treatments which predominate in hydrogenation-dehydrogenation. In the first stage hydrodesulfurization, the sulfur compounds present in the stock are substantially completely destroyed, with the formation of hydrogen sulfide, and the proportion of the unstable, olefinic hydrocarbons present in the stock or formed during the desulfurization is hydrogenated and converted to more stable compounds. During the second stage, generally conducted in the presence of a catalyst, the predominant reactions are cracking and reforming in the presence of hydrogen under optimum conditions to obtain gasoline products which have high octane numbers and good lead susceptibility. One particular advantage of these prior art processes is that the bulk of the sulfur compounds and the majority of the coke-forming olefins are eliminated in the first stage so that the catalyst in the second stage is not substantially converted to sulfides nor is it subjected to conditions of rapid coke deposition. The products formed are entirely free of hydrogen sulfide and have a very low content of sulfur compounds. Products may be produced containing only 0.09 to 0.016 percent or lower content of sulfur in the form of organic sulfur compounds other than mercaptans in accordance with prior art teachings. Further, it is sometimes the practice, after the desulfurization reaction, to subject the feed to dehydrogenation and reforming at temperatures in the range of 950° F. to 1100° F. for the purpose of increasing the value of the products as motor fuel by reason of increased anti-knock rating.

However, these prior art processes cannot be depended upon to produce products which are consistently free of corrosive sulfur compounds as indicated by their ability to pass the Distillation-Corrosion test because there is a sharp distinction between desulfurization as meant in the prior art and the desulfurization necessary to produce a non-corrosive naphtha. Thus, the desulfurization by whatever method may take place to the extent of 90 to 98 percent sulfur removal, but the products produced will not be non-corrosive and will not pass the critical Distillation-Corrosion test. On the other hand, desulfurization may be of such nature that non-corrosive naphthas are produced through the conversion of corrosive sulfur compounds to a non-corrosive variety without appreciable total sulfur reduction taking place. It follows, therefore, that certain naphthas may be more corrosive after desulfurization than before and, further, a naphtha which gives a sour "Doctor" test may be non-corrosive while a sweet naphtha may be corrosive.

Accordingly, the primary object of this invention is to provide a two-stage process of producing improved naphthas of good solvency characteristics and low corrosive sulfur content.

Another object is to provide a combination process of two-stage hydrodesulfurization and chemical treatment which produces improved naphthas.

A third object of this invention is to provide a method of producing naphthas which pass the Distillation-Corrosion test.

A fourth object is to provide a combination two-stage hydrodesulfurization and chemical treatment using the same type of catalyst in each stage to produce acceptable, sweet, odor-free, and non-corrosive, sulfur-free special solvent naphthas.

These and other objects will become apparent as the description of the invention proceeds.

The attached drawing is a diagrammatic illustration of the flow of materials in the steps of the process.

According to the present invention, the difficulties aforementioned are eliminated by subjecting the raw or virgin hydrocarbon feed stocks to catalytic desulfurization in a first stage, followed by stabilization and treatment in a second stage to chemical reactions either catalyzed by or in the presence of the same type of contact material used in the first stage. The chemical treatment is conducted under relatively mild conditions as compared with the hydrodesulfurization reaction and in the absence of hydrogen. The products from this treatment may be fractionated into various specialty naphthas or solvents and are characterized principally by their freedom from those types of corrosive sulfur compounds which give a positive Distillation-Corrosion test. In addition, the products have high solvency power and are odor-free.

In carrying out the present invention, any hydrocarbon material from which naphthas or solvents or similar products may be obtained can be used wherein the objective is to overcome the tendency toward the formation or carry-over of those types of sulfur compounds which cause a positive Distillation-Corrosion test. Crude oil is one source of material from which large quantities of solvents and naphthas are produced. It is preferred to prolong catalyst life that the more volatile components and the high boiling residues present be removed by fractionation or other methods prior to treatment in accordance with this invention. For example, a crude oil containing from 1.0 to 3.0 or as high as 7.0 weight percent of sulfur is fractionated to obtain a wide boiling range virgin or straight run naphtha having an end boiling point of about 500° F. A gas oil fraction may be used which may boil between about 500° and 700° F. Kerosene fractions may also be used. Preferably a straight run naphtha fraction boiling between 110° and 450° F. is used.

The boiling range of the particular fraction removed for treatment in accordance with this invention may be varied somewhat from the boiling ranges given depending upon the relative amounts of specialty naphtha, rubber solvent, V. M. & P. naphthas desired. By narrowing the boiling range of the virgin naphtha to within 100° to 250° F., the process may be directed to obtaining rubber solvents almost exclusively. On the other hand, by starting with a fraction boiling between 200° and 400° F., the process may be directed to production of V. M. & P. solvents and specialty naphthas. In one specific embodiment of the invention, the treatment of the entire first fraction boiling up to 500° F. or more to produce a wide variety of products ranging from rubber solvents up to high boiling specialty naphthas including, for example, petroleum ether 90°–140° F., Special Textile Spirits 180°–210° F., Light Mineral Spirits 290°–330° F., Stoddard Solvent 310°–385° F., and High Flash Dry Cleaning Solvent 360°–400° F., all being non-corrosive, odorless, and meeting the rigorous requirements of the industry, is contemplated.

The virgin naphtha fraction selected from the crude is subjected to a catalytic hydrodesulfurization treatment carried out in accordance with well known techniques at elevated temperatures. In the treatment, the sulfur content of the charge stock is removed in the form of a gas such as hydrogen sulfide by the action of hydrogen and desulfurization catalysts, such as molybdates, sulfides, and oxides of iron group metals and mixtures including cobalt molybdate, chromic oxide, vanadium oxide with molybdena and alumina, and sulfides of tungsten, chromium, or uranium. A preferred catalyst for the reaction is a cobalt oxide-molybdena-alumina catalyst or a chromia-molybdena-alumina catalyst. Commercially available cobalt molybdate catalysts are very suitable for the process. The process may be carried out in either the liquid or gaseous phase at temperatures ranging from 500° to 800° F. and under pressures from 20 to 1000 pounds per square inch. The virgin naphtha fraction subjected to hydrodesulfurization may contain from about 1.0 to about 3.0 percent by weight of sulfur. Generally the types of fractions suitable for the preparation of solvent naphthas will contain about from below 0.1 to 3.0 percent. The charge may be introduced to the catalyst zone at from 0.5 to 10 liquid volumes per bulk volume of catalyst per hour.

The fraction selected from the crude oil is conducted to the hydrodesulfurization reaction zone, as shown in the diagram, which illustrates the processing of a virgin fraction. The preferred conditions of hydrodesulfurization are at approximately 750° F. under 250 pounds per square inch pressure and with a space velocity of 0.3 to 2.0 with hydrogen recirculated at a rate of about 3000 s. c. f. of hydrogen per barrel of charge. The reactor may be of the fixed bed or fluidized bed type.

The products from the hydrodesulfurization are subjected to stabilization wherein the hydrogen sulfide and any fixed gases are removed from the liquid product. Removal of hydrogen sulfide from the liquid product could also be accomplished by countercurrent contact with an amine solution. The hydrogen may also be purified by removal of hydrogen sulfide and recycled back to the first stage of the process. The hydrogen sulfide removed may be used to prepare free sulfur. The sour product from the hydrodesulfurization is conducted to a second stage partial desulfurization and/or chemical reaction wherein the conditions are somewhat critical, being preferably at about 400° to 500° F. with atmospheric pressures. The preferred conditions for the second stage treatment are approximately 450° F., atmospheric pressure, under a space velocity of about 1.0 in the absence of hydrogen. The contact material for the chemical reaction is of the same type as used for the hydrodesulfurization reaction. In one embodiment of the invention, the identical catalytic or contact material is used for the chemical treatment as was used for the initial hydrodesulfurization.

The invention is not to be limited by any theories herein propounded or inherently set forth but it is supposed that the relatively low temperatures in the second stage initiate a combination of catalytic and non-catalytic reactions wherein there is a chemical tie-up of the corrosive sulfur compounds which are detrimental in the end products. Since there is no substantial evidence of any considerable reduction in total sulfur in the process, at least a part of the reaction is the conversion of the deleterious sulfur compounds to forms which do not affect the Distillation-Corrosion test. Since the second stage reaction is in the absence of hydrogen, no hydrogen sulfide appears in the products. Consequently, there is no need for subsequent stabilization or caustic washing and the effluent from the second stage chemical treatment may be immediately fractionated to yield the desired naphthas. The main reduction of sulfur compounds takes place during the initial hydrodesulfurization and consequently the life of the contact material used in the second stage reaction is sustained.

In order to illustrate the invention, a 425° F. end point fraction from Yates crude was hydrodesulfurized using cobalt molybdate as catalyst at 750° F. and 250 p. s. i. g., space velocity of about 1 and hydrogen recirculation at rate of 3000 s. c. f. per barrel. The desulfurized but corrosive product was stabilized to remove hydrogen sulfide. The stabilized product was then run through a reactor containing cobalt molybdate at 450° F., substantially atmospheric pressure and with no hydrogen present. Under these latter conditions a trace of free sulfur is removed from the hydrodesulfurized product so that the finished material is non-corrosive. The actual sulfur reduction is practically nil since the amount of free sulfur removed is less than 0.001 percent which is about the minimum which can be reported in the sulfur distribution. In the chemical treatment or sweetening step, the free sulfur probably reacts with the cobalt molybdate to form metal sulfides. The quantity of free sulfur removed is so small that very high yields of non-corrosive naphthas are obtained before regeneration becomes necessary.

Tests on charge and products are shown in the following table:

| Sulfur Distribution | Charge | Hydro-desulfurized Product | Non-Corrosive Product |
|---|---|---|---|
| Wt. Percent: | | | |
| Free—S | Nil | Nil | Nil |
| $H_2S$—S | Nil | Nil | Nil |
| RSH—S | 0.100 | Nil | Nil |
| $R_2S_2$—S | 0.021 | Nil | Nil |
| $R_2S$—S | 0.071 | 0.006 | 0.006 |
| Residual—S | 0.016 | 0.003 | 0.003 |
| Total—S | 0.208 | 0.009 | 0.009 |
| Doctor Test | Pos. | ¹ Neg. | Neg. |
| Lead Acetate Test | Pos. | ² Pos. | Neg. |
| Mercury Test | Pos. | ¹ Pos. | Neg. |
| Distillation—Corrosion Test | Pos. | Pos. | Neg. |

¹ After $H_2S$ removal.
² Before $H_2S$ removal.

The non-corrosive material may be fractionated into various naphthas.

Referring to the table, it is seen that the first stage hydrodesulfurization was effective in removing a substantial portion of the sulfur compounds and that this product failed to pass the Distillation-Corrosion test in addition to exhibiting other evidences of a corrosive sulfur content, although being Doctor sweet. The non-corrosive product from the chemical treatment, although having a total sulfur of 0.006, meets the rigorous requirements of the Distillation-Corrosion test.

It is apparent from this description that the invention is not necessarily limited to the details set forth. The invention may be practiced in one step by taking a sour hydrodesulfurized product which has been stabilized and transforming it into an acceptable, sweet, non-corrosive product by applying the second stage chemical treatment thereto. The invention may be carried out by subjecting the feed stock to catalytic desulfurization in the presence of hydrogen in order to attack the mercaptans, disulfides, free sulfur, and thermally stable sulfur compounds present as by hydrodesulfurization, followed by a chemical treatment at 400° to 500° F. in the presence of a hydrodesulfurization catalyst in the absence of hydrogen to remove or transform the remaining corrosive free-sulfur or sulfur compounds.

What we claim as our invention is:

1. The process for producing special solvent naphthas from petroleum hydrocarbon mixtures containing at least about 1.0 weight percent total sulfur which comprises separating a virgin naphtha fraction having an end boiling point of about 425° F. from said mixtures subjecting said fraction to catalytic hydrodesulfurization in the presence of a catalyst selected from the group consisting of cobalt molybdate, cobalt oxide-molybdena-alumina and chromia-molybdena-alumina at temperatures of about 500 to 800° F. under conditions whereby said sulfur compounds are converted to hydrogen sulfide, separating hydrogen sulfide therefrom to produce a hydrodesulfurized product, subjecting said hydrodesulfurized product to chemical treatment by contact in the absence of hydrogen at temperatures of about 400 to 500° F. in the presence of a contact material selected from the group consisting of cobalt molybdate, cobalt oxide-molybdena-alumina and chromia-molybdena-alumina, and separating an odor-free product characterized by its ability to pass the Distillation-Corrosion test.

2. The method in accordance with claim 1 in which the hydrodesulfurization catalyst and the chemical contact material comprise cobalt molybdate and the chemical treatment is carried out at a temperature of about 450° F. under a space velocity of about 1.0.

3. The method in accordance with claim 1 in which the virgin fraction has an initial boiling point of about 110° F.

4. The method in accordance with claim 1 in which the hydrodesulfurization product contains about 0.006 weight percent of sulfur.

References Cited in the file of this patent

UNITED STATES PATENTS

| 2,417,308 | Lee | Mar. 11, 1947 |
| 2,537,756 | Heinemann | Jan. 9, 1951 |
| 2,560,330 | Brandon | July 10, 1951 |

FOREIGN PATENTS

| 350,494 | Great Britain | Dec. 10, 1930 |
| 418,926 | Great Britain | Nov. 2, 1934 |